United States Patent Office 3,369,049
Patented Feb. 13, 1968

3,369,049
METHOD OF PREPARING UNSATURATED
ALDEHYDES AND CATALYST THEREFOR
Jamal S. Eden, Akron, Ohio, assignor to The B. F. Goodrich Company, New York, N.Y., a corporation of New York
No Drawing. Filed Jan. 20, 1964, Ser. No. 338,571
11 Claims. (Cl. 260—604)

This invention relates to a method for preparing acrolein or methacrolein by the catalytic oxidation of propylene or isobutylene in the presence of a catalyst comprising a copper phosphate, a tellurium compound and a rhenium compound at elevated temperatures, and more particularly pertains to a method of oxidizing propylene or isobutylene to acrolein or methacrolein, respectively, by passing a mixture of the olefin and an oxygen containing gas, with or without water vapor, through a catalyst bed at a temperature of about 300–500° C., wherein the catalyst is a mixture of a copper phosphate, particularly copper pyrophosphate, an inorganic oxygen containing tellurium compound, such as tellurium oxide and a rhenium compound such as rhenium oxide or perrhenic acid. The ratio of copper pyrophosphate to tellurium to rhenium can be 100:10–30:1–10. This can be written empirically as $Cu_{200}P_{200}O_{724-800}Te_{10-30}Re_{1-10}$, in which P is present as a phosphate.

It is known that propylene can be oxidized to acrolein with copper containing catalysts, but the conversion of the propylene and yield of acrolein are quite low, so that the efficiency is also low. The catalytic oxidation of isobutylene to methacrolein is usually more difficult because of the lack of selectivity of the catalysts normally used for the oxidation of propylene. The presence of two methyl groups adjacent to the double bonds in isobutylene makes the catalytic conversion of the olefin to methacrolein quite difficult. It is therefore unusual to find a catalyst which has approximately the same efficiency for oxidizing both olefins mentioned above to the corresponding aldehydes, and which converts isobutylene at a lower temperature than propylene. The preferred temperature for preparing acrolein is 420–475° C. and that for methacrolein is 325–450° C.

With the catalysts of this invention it is possible to obtain efficiencies of up to 61.3 for acrolein and up to 58.3 for methacrolein.

REACTANTS

The only essential reactants are oxygen or an oxygen containing gas mixed with an inert gas. The source of oxygen can be relatively pure oxygen, air or a mixture of oxygen diluted with nitrogen so that it contains more than 21% oxygen. Oxygen can also be diluted with other inert gases such as neon, krypton, xenon or helium.

The olefin can be propylene or isobutylene. For the purpose of this invention these olefins can be defined by the generic formula

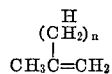

where $n=0$ to $1$.

The olefins need not be pure. They can contain appreciable amounts of saturated alkanes or other hydrocarbons without interference with the main reaction, except for the consumption of some oxygen due to oxidation of a portion of the hydrocarbon contaminants.

Water vapor is not an essential ingredient for the reaction, but it does seem to improve yields of the desired aldehyde at any given temperature and it may also act as a heat absorbing medium which tends to aid in temperature control of the reaction.

The ratios of reactants can vary between 1–3 mols oxygen and 0–7 mols water vapor per mol of olefin.

THE CATALYST

The catalyst is a mixture of a copper phosphate which can be $Cu_2(PO_4)_3$, $Cu_2P_2O_7$ or a copper polyphosphate, such as $Cu_5(P_3O_{10})_2$ with tellurium oxide and a rhenium oxide which can be perrhenic acid or $Re_2O_7$. The molar ratio of ingredients can vary between about 100 for a phosphate, 10–30 for $TeO_2$ and 1–10 for $HReO_4$ or a corresponding amount of $Re_2O_7$.

CATALYST PREPARATION

The catalyst can be prepared by several procedures and it can be supported or unsupported.

For fixed bed reactions the catalyst of 10–18 U.S. sieve size is preferred and for fluid bed reactions a U.S. sieve size of 80–325 mesh is preferred.

Method I 34.1 g. $CuCl_2 \cdot 2H_2O$ were dissolved in water.

1.6 g. $TeO_2$ were added to the $CuCl_2$ solution.

1 g. of $HReO_4$ dissolved in water was added to the $CuCl_2 \cdot TeO_2$ mixture.

23.3 g. of 85% $H_3PO_4$ were added to the mixture of the above ingredients.

Then 247.8 of a microspheroidal colloidal silica dispersion in water, containing 30–35% by weight $SiO_2$, were added to the remaining ingredients. After thorough stirring, the mixture was evaporated to dryness on a steam bath and thereafter baked at 400° C. for about 16 hours. If desired, drying can be effected by a spray-drying technique. The catalyst was then cooled, crushed and screened to the desired sizes.

Method II

In this procedure the $TeO_2$ was dissolved in concentrated HCl to form a homogeneous mixture prior to the addition of the $H_3PO_4$. Otherwise the steps are the same as in Method I.

Method III

Dry, particulate $Cu_2P_2O_7$, $TeO_2$ and $Re_2O_7$ are blended and ground in a ball mill to the desired fineness and screened. If a support is desired it can be added to the ball mill with the remaining ingredients.

Method IV

A paste of $Cu_2P_2O_7$ or other copper phosphate is first prepared, dry $TeO_2$ and $Re_2O_7$ or $HReO_4$ are added thereto in the required amounts. The support can be blended with the paste, then dried and baked, as indicated above.

The supports are preferably finely divided refractory materials with low porosity. Suitable supports include silicic materials such as colloidal silica, kieselguhr, clay, diatomaceous earth, alumina, aluminum phosphate, zirconium oxide, and silicon carbide.

The most preferred supports are colloidal silica and diatomaceous earth.

REACTION CONDITIONS

The reaction is carried out at a temperature of from about 300°–500° C. and preferably between about 330°–480° C. The best reaction temperature for converting propylene to acrolein is somewhat higher than that for oxidizing isobutylene to methacrolein, but both aldehydes are prepared in most desirable yields and efficiencies in the range of 330°–450° C. for methacrolein and 420°–480° C. for acrolein.

The contact time can range between about 2 to about 70 seconds, but the preferred range is 8 to about 20 seconds. The most desirable contact time will depend in part on the ratios of the reactants and in part on the reaction temperature. The pressure is not critical, it can range from atmospheric to about 100 p.s.i.

EXAMPLE I

In this example 40 ml. of a catalyst prepared by method I, having a molar ratio of 50 $Cu_2P_2O_7$, 5 $TeO_2$ and 2 $HReO_4$ on 620 mols colloidal silica, were placed in a high silica (Vycor) tube reactor 6 in. long and 22 mm. O.D. The reactor was electrically heated by three coils, one of which extended along the entire length of the reactor and each of the other two coils extended about 50% of the reactor length. The reactor was preheated to about 280°–300° C. and then steam at a temperature of about 250° C. was admitted through one opening in the reactor. The requisite amount of propylene was blended with the steam just prior to entry into the reactor and oxygen (supplied as air) in the required amount was fed into the reactor through a separate entry port.

The reactor temperature was then raised to the temperature indicated in the table of data below. The contact time is cold contact time, the hot contact time is about 40% of the cold contact time listed.

The effluent gases were run through a condenser. The uncondensed gases were passed directly through a vapor phase chromatograph (Perkin-Elmer 154) and analyzed. The condensed liquids were weighed and then vaporized and passed through a vapor phase chromatograph for analysis.

The data obtained in several runs are tabulated below:

EXAMPLE II

In this example the catalyst was composed of a molar ratio of 50 $Cu_2P_2O_7$, 5 $TeO_2$ and 2 $HReO_4$ on 620 mols of $SiO_2$. The reaction mixture consisted of 1.1 mols of oxygen, supplied as air, and 4.4 mols of water vapor per mol of propylene. The reaction was carried out at 425° C. in the reactor described above. The cold contact time was 18.85 seconds. The propylene conversion was 48.7%, the yield of acrolein was 69.9% for an efficiency of 34.0%.

EXAMPLE III

A series of runs was made using several ratios of catalyst ingredients and varying ratios of oxygen to propylene and water vapor to propylene.

The reaction conditions of each run and other pertinent data are recorded in the following table:

| Catalyst | | | | Contact Time, sec. | $O_2/C_3H_6$ | $H_2O/C_3H_6$ | Temp., °C. | Mol Percent | | Efficiency |
|---|---|---|---|---|---|---|---|---|---|---|
| $Cu_2P_2O_7$ | $TeO_2$ | H $ReO_4$ | $SiO_2$ | | | | | Propylene Conversion | Acrolein Yield | |
| 50 | 15 | 10 | 620 | 11.4 | 2.1 | 3.6 | 450 | 91.7 | 66.9 | 61.3 |
| 50 | 15 | 1 | 310 | 10.5 | 2.5 | 4.5 | 420 | 86.3 | 67.8 | 58.5 |
| 100 | 20 | 1 | 1,240 | 11 | 1.1 | 4.3 | 445 | 76.5 | 70.1 | 53.6 |
| 50 | 15 | 1 | 620 | 12.5 | 2.5 | 3.6 | 420 | 61.4 | 83.0 | 51.0 |
| 50 | 10 | 1 | 620 | 9.3 | 2.1 | 4.3 | 440 | 70.6 | 72.6 | 51.2 |
| 50 | 5 | 2 | 620 | 18.3 | 2.1 | 5.1 | 430 | 75.6 | 60.7 | 45.9 |
| 50 | 5 | 1 | 620 | 14 | 2.2 | 4.5 | 435 | 67.4 | 63.5 | 42.8 |
| 100 | 10 | 1 | 1,240 | 9.6 | 2.1 | 3.7 | 460 | 55.0 | 75.5 | 41.5 |
| 100 | 30 | 1 | 1,240 | 9.3 | 1.5 | 4.3 | 450 | 54.9 | 68.6 | 37.7 |
| 50 | 15 | 1 | 620 | 12.5 | 2.5 | 3.6 | 420 | 61.4 | 83.0 | 51.6 |
| 50 | 15 | 1 | 310 | 10.6 | 2.5 | 4.5 | 420 | 86.3 | 67.8 | 58.5 |
| 50 | 15 | 1 | 155 | 11.0 | 1.5 | 4.5 | 440 | 41.3 | 91.0 | 37.7 |

The catalyst shows the molar ratios of ingredients used in its preparation. The contact time is cold contact time.

EXAMPLE IV

A catalyst having a molar ratio of 50 $Cu_2P_2O_7$, 15 $TeO_2$, 1 $HReO_4$ impregnated on 310 mols of $AlPO_4$ was used in this test by the procedure detailed in Example I. The $O_2/C_3H_6$ ratio was 2.2, the $H_2O/C_3H_6$ ratio was 3.5, the temperature was 450° C. and the cold contact time was 14.1 seconds. Under these conditions 63.6% of the propylene was converted, to give a 76.1% yield of acrolein, for an efficiency of 48.4%.

EXAMPLE V

The catalyst for this run was composed of 50 $Cu_2P_2O_7$, 15 $TeO_2$, 1 $HReO_4$ on 620 mols of $ZrO_2$. The procedure was the same as already described. The $O_2/C_3H_6$ ratio was

| $O_2/C_3H_6$ | $H_2O/C_3H_6$ | Contact Time, sec. | Temp., °C. | Mol Percent Conversion $C_3H_6$ | Mol Percent Yield Acrolein | Mol Percent Efficiency |
|---|---|---|---|---|---|---|
| 1.1 | 4.4 | 10.8 | 420 | 45.3 | 71.7 | 32.5 |
| 1.1 | 4.4 | 18.9 | 425 | 45.3 | 71.3 | 32.2 |
| 1.5 | 4.4 | 9.1 | 470 | 54.7 | 65.5 | 35.8 |
| 2.0 | 3.4 | 9.1 | 480 | 66.1 | 68.4 | 45.2 |
| 2.1 | 5.1 | 18.3 | 430 | 75.6 | 60.7 | 45.9 |
| 2.1 | 4.3 | 9.3 | 430 | 80.4 | 55.6 | 44.7 |

For comparative purposes a mixture of 1.1 mols oxygen (supplied as air) and 4.4 mols of water vapor per mol of propylene was fed into the reactor containing a catalyst composed of 10 mols $Cu_2P_2O_7$ and 1 mol of $TeO_2$. The reaction conditions were substantially the same as those of run 1 above. The propylene conversion was 41.7% and the acrolein yield was 56.1 with an efficiency of 23.4%. In another comparative test a catalyst consisting of 25 mols $Cu_2P_2O_7$ and 1 mol $HReO_4$ was used, with the same feed ratio described immediately above. The reaction temperature was 460° C. The propylene conversion was 41.5%, acrolein yield was 41.5% for an efficiency of 17.2%. When $Cu_2P_2O_7$ alone was used as the catalyst, using the feed mixture described immediately above and a reaction temperature of 460° C., only 9.4% of the propylene was converted, with a 65.9% yield of acrolein, thus having an efficiency of 6.24%.

1.1, $H_2O/C_3H_6$ was 4.3, cold contact time was 11.2 seconds and the reaction temperature was 450° C. This catalyst converted 53.2% of the propylene, with a 70% yield of acrolein for an efficiency of 37.2%.

EXAMPLE VI

Forty ml. of a catalyst comprising 50 mols $Cu_2P_2O_7$, 10 $TeO_2$, 1 $HReO_4$ impregnated on 620 mols of a microspheroidal colloidal silica support were placed in the reactor described in Example I. A feed containing a molar ratio of one mol of isobutylene, 2 mols of oxygen, supplied as air, and 4.1 mols of water vapor was passed through a fixed bed of the catalyst at a rate to provide a cold contact time of 9.5 seconds. At 330° C., 93.6% of the isobutylene fed was converted, to yield 56.8% methacrolein, for an efficiency of 53.2%.

EXAMPLE VII

The catalyst of this example had a molar ratio of 50 $Cu_2P_2O_7$, 15 $TeO_2$, 1 $HReO_4$ on 310 mols of a microspheroidal colloidal silica. The feed contained a molar ratio of one mol isobutylene, 1.5 mols of oxygen, supplied as air, and 4.1 mols of water vapor. The feed rate was regulated to provide a cold contact time of 27.5 seconds. At 360° C. all the isobutylene in the feed was converted, to yield 58.3% methacrolein. The reactor was then described in Example I and 40 ml. of catalyst were used in a fixed bed.

EXAMPLE VIII

The catalyst for this series of runs had a molar ratio of 50 $Cu_2P_2O_7$, 5 $TeO_2$ and 2 $HReO_4$ on 620 mols of $SiO_2$. The data, tabulated below, show results obtained with several oxygen-isobutylene ratios:

| $O_2/C_4H_8$ | $H_2O/C_4H_8$ | Contact Time, sec. | Temp., °C. | Mol Percent Conversion $C_4H_8$ | Mol Percent Yield Methacrolein | Mol Percent Efficiency |
|---|---|---|---|---|---|---|
| 1.0 | 4.0 | 18.6 | 420 | 76.6 | 56.6 | 43.4 |
| 1.3 | 4.0 | 9.0 | 440 | 50.8 | 70.7 | 35.9 |
| 2.0 | 4.7 | 10.4 | 450 | 88.1 | 49.6 | 43.7 |

I claim:
1. A method of preparing a compound of the formula

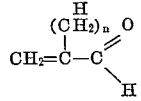

where $n$ is 0 to 1, comprising contacting a mixture of reactants with catalyst comprising, on a molar basis, 100 of of a copper phosphate, 10–30 $TeO_2$ and 1–10 $HReO_4$ on a refractory support, at a temperature of from about 300° to about 500° C. with a contact time of from about 5 to about 50 seconds, the said reactants on a molar basis comprising
   (a) one mole of a hydrocarbon of the formula

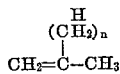

(b) sufficient oxygen containing gas to provide 1–3 mols of oxygen per mol of said hydrocarbon, and
   (c) 0–7 mols of water vapor per mol of said hydrocarbon.

2. The method of claim 1 in which the copper phosphate is $Cu_2P_2O_7$.

3. The method of claim 1 in which the molar ratio of the catalyst is 100 $Cu_2P_2O_7$, 10–30 $TeO_2$ and 1–2 $HReO_4$ 4. A method of preparing acrolein comprising passing a mixture of reactants through a catalyst comprising, on a molar basis, 100 $Cu_2P_2O_7$, 10–30 $TeO_2$ and 1–2 $HReO_4$ on a silicic support at a temperature of from about 400°–500° C. with a contact time of from about 9 to about 20 seconds, the said reactants on a molar basis comprising
   (a) one mol of propylene,
   (b) from about 1 to about 2.5 mols of oxygen supplied as air, and
   (c) from 0–7 mols of water vapor.

5. The method of claim 4 in which the temperature is 420°–470° C. and the amount of water vapor is from about 3 to about 5.1 mols per mol of propylene.

6. The method of claim 5 in which the catalyst is fluidized.

7. The method of claim 5 in which the catalyst is in a fixed bed.

8. The method of preparing methacrolein comprising passing a mixture of reactants through a catalyst comprising, on a molar basis, 100 $Cu_2P_2O_7$, 10–30 $TeO_2$ and 1–2 $HReO_4$ on a silicic support, at a temperature of from about 300° C. to about 450° C., with a contact time of from about 5 to about 30 seconds, the said reactants on a molar basis comprising
   (a) one mol of isobutylene,
   (b) 1–3 mols of oxygen supplied as air, and
   (c) 0–7 mols of water vapor.

9. The method of claim 8 in which the temperature is between about 330° and 450° C. and the water vapor is about 3 to about 5 mols per mol of isobutylene.

10. The method of claim 8 in which the catalyst is in a fixed bed.

11. The method of claim 8 in which the catalyst is fluidized.

References Cited
UNITED STATES PATENTS

| | | | |
|---|---|---|---|
| 2,496,621 | 2/1950 | Deery | 252—437 |
| 2,627,527 | 2/1953 | Connolly et al. | 260—604 |
| 2,662,921 | 12/1953 | Middleton | 260—604 |
| 2,670,380 | 2/1954 | Hadley | 260—604 |
| 3,044,965 | 7/1962 | Callahan | 252—437 |
| 3,044,966 | 7/1962 | Callahan et al. | 252—437 |

BERNARD HELFIN, *Primary Examiner.*
LEON ZITVER, *Examiner.*
R. H. LILES, J. J. SETELIK, *Assistant Examiners.*